United States Patent
Bates et al.

(10) Patent No.: US 9,684,584 B2
(45) Date of Patent: *Jun. 20, 2017

(54) MANAGING ASSERTIONS WHILE COMPILING AND DEBUGGING SOURCE CODE

(71) Applicant: International Business Machines Corporation, Armonk, NY (US)

(72) Inventors: Cary L. Bates, Rochester, MN (US); Lee Helgeson, Rochester, MN (US); Justin K. King, Rochester, MN (US); Michelle A. Schlicht, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/587,797

(22) Filed: Dec. 31, 2014

(65) Prior Publication Data

US 2016/0188440 A1   Jun. 30, 2016

Related U.S. Application Data

(63) Continuation of application No. 14/585,771, filed on Dec. 30, 2014.

(51) Int. Cl.
G06F 9/45 (2006.01)
G06F 11/36 (2006.01)

(52) U.S. Cl.
CPC ...... *G06F 11/3624* (2013.01); *G06F 11/3664* (2013.01); *G06F 8/41* (2013.01)

(58) Field of Classification Search
None
See application file for complete search history.

(56) References Cited

U.S. PATENT DOCUMENTS 5,487,134 A   1/1996  Ballard
5,544,305 A   8/1996  Ohmaye et al.
(Continued)

FOREIGN PATENT DOCUMENTS

JP   2008276556 A   11/2008
WO   2011042730 A1   4/2011

OTHER PUBLICATIONS

List of IBM Patents or Patent Applications Treated As Related.
(Continued)

*Primary Examiner* — Qamrun Nahar
(74) *Attorney, Agent, or Firm* — Patterson + Sheridan, LLP (57) ABSTRACT

The present disclosure relates to maintaining assertions in an integrated development environment (IDE) tool. According to one embodiment, while the IDE tool is compiling the source code of a development project, the IDE tool generates at least a first compiler warning. The first compiler warning generally corresponds to at least one line of source code in a first source code component of the development project. A first set of assertions to add to the source code of the development project is determined based on the line of source code that resulted in the first compiler warning. The IDE tool adds the first set of assertions to the source code of the development project. The first set of assertions are compiled as part of the source code of the development project.

12 Claims, 7 Drawing Sheets

(56) References Cited

U.S. PATENT DOCUMENTS

| | | | |
|---|---|---|---|
| 6,117,180 | A | 9/2000 | Dave et al. |
| 6,457,176 | B1 | 9/2002 | King |
| 6,701,518 | B1 | 3/2004 | Dwyer et al. |
| 6,848,088 | B1 | 1/2005 | Levitt et al. |
| 7,322,026 | B2 | 1/2008 | Ahluwalia et al. |
| 7,426,705 | B1 | 9/2008 | Kolaric |
| 7,467,712 | B2 | 12/2008 | Carroscia |
| 7,603,659 | B2 | 10/2009 | Blumenthal et al. |
| 7,908,602 | B2 | 3/2011 | Alcorn et al. |
| 8,516,533 | B2 | 8/2013 | Davis et al. |
| 8,571,538 | B2 | 10/2013 | Sprigg et al. |
| 8,635,204 | B1 | 1/2014 | Xie et al. |
| 8,843,910 | B1 | 9/2014 | Schwerin et al. |
| 8,850,391 | B1 | 9/2014 | Lin et al. |
| 9,417,990 | B2 | 8/2016 | Michelsen |
| 9,547,483 | B1 | 1/2017 | Boxall et al. |
| 2003/0110472 | A1 | 6/2003 | Alloing et al. |
| 2004/0117771 | A1 | 6/2004 | Venkatapathy |
| 2004/0128584 | A1 | 7/2004 | Mandava et al. |
| 2004/0186817 | A1 | 9/2004 | Thames et al. |
| 2004/0261059 | A1 | 12/2004 | Spencer et al. |
| 2005/0055605 | A1* | 3/2005 | Blumenthal .......... G06F 11/362 714/13 |
| 2005/0204345 | A1 | 9/2005 | Rivera et al. |
| 2005/0229154 | A1 | 10/2005 | Hiew et al. |
| 2005/0246693 | A1 | 11/2005 | Plum |
| 2006/0031807 | A1 | 2/2006 | Abramovici |
| 2006/0075304 | A1 | 4/2006 | Canning et al. |
| 2006/0179425 | A1 | 8/2006 | Scougall et al. |
| 2006/0236319 | A1 | 10/2006 | Pinnix et al. |
| 2006/0271917 | A1 | 11/2006 | Das et al. |
| 2006/0294502 | A1 | 12/2006 | Das et al. |
| 2007/0043760 | A1 | 2/2007 | Johannes Maria Meijer et al. |
| 2007/0294651 | A1 | 12/2007 | Tsai et al. |
| 2008/0066030 | A1 | 3/2008 | Hekmatpour et al. |
| 2008/0098366 | A1 | 4/2008 | Fong et al. |
| 2008/0127101 | A1 | 5/2008 | Anafi et al. |
| 2008/0270980 | A1 | 10/2008 | Ahadian et al. |
| 2008/0276556 | A1 | 11/2008 | Flint et al. |
| 2009/0064111 | A1 | 3/2009 | Kornerup et al. |
| 2009/0070734 | A1 | 3/2009 | Dixon et al. |
| 2009/0172529 | A1 | 7/2009 | Jas et al. |
| 2009/0193398 | A1 | 7/2009 | Mitchell |
| 2009/0204931 | A1 | 8/2009 | Lim et al. |
| 2009/0215018 | A1 | 8/2009 | Edmondson et al. |
| 2010/0122234 | A1 | 5/2010 | Le Bars et al. |
| 2010/0153915 | A1 | 6/2010 | Schneider |
| 2010/0162209 | A1 | 6/2010 | Brown et al. |
| 2010/0169874 | A1 | 7/2010 | Izard et al. |
| 2010/0175052 | A1 | 7/2010 | Prasad et al. |
| 2010/0218174 | A1 | 8/2010 | Schneider |
| 2010/0325262 | A1 | 12/2010 | Allen et al. |
| 2011/0145788 | A1 | 6/2011 | Xu et al. |
| 2011/0197176 | A1 | 8/2011 | Muharsky et al. |
| 2012/0222014 | A1 | 8/2012 | Peretz et al. |
| 2012/0278738 | A1 | 11/2012 | Kruse et al. |
| 2012/0278791 | A1 | 11/2012 | Geist |
| 2013/0017522 | A1 | 1/2013 | Nguyen et al. |
| 2013/0061209 | A1 | 3/2013 | Lam |
| 2013/0073909 | A1 | 3/2013 | Baudel et al. |
| 2013/0111428 | A1 | 5/2013 | Begel et al. |
| 2013/0138701 | A1 | 5/2013 | Jin |
| 2013/0159963 | A1 | 6/2013 | Dhalait |
| 2013/0268912 | A1 | 10/2013 | Kizhakkevalappil et al. |
| 2013/0344859 | A1 | 12/2013 | Abramson et al. |
| 2014/0068559 | A1 | 3/2014 | Szocs |
| 2014/0068567 | A1 | 3/2014 | Smith et al. |
| 2014/0101640 | A1 | 4/2014 | Romdhane |
| 2014/0165208 | A1 | 6/2014 | Chevallier-Mames et al. |
| 2014/0173561 | A1 | 6/2014 | Toub |
| 2014/0180961 | A1 | 6/2014 | Hankins et al. |
| 2014/0181794 | A1 | 6/2014 | Grawrock et al. |
| 2014/0208431 | A1 | 7/2014 | Archer et al. |
| 2014/0258986 | A1 | 9/2014 | Wang et al. |
| 2015/0082263 | A1 | 3/2015 | Vasudevan et al. |
| 2015/0143335 | A1 | 5/2015 | Jain et al. |
| 2015/0178052 | A1 | 6/2015 | Gupta et al. |
| 2016/0098562 | A1 | 4/2016 | Hawblitzel et al. |
| 2016/0179477 | A1 | 6/2016 | Bates et al. |
| 2016/0179478 | A1 | 6/2016 | Bates et al. |
| 2016/0179479 | A1 | 6/2016 | Bates et al. |
| 2016/0179503 | A1 | 6/2016 | Bates et al. |
| 2016/0179507 | A1 | 6/2016 | Bates et al. |
| 2016/0179508 | A1 | 6/2016 | Bates et al. |
| 2016/0188439 | A1 | 6/2016 | Bates et al. |

OTHER PUBLICATIONS

Bates et al., "Optimizing Program Performance With Assertion Management"; U.S. Appl. No. 14/574,459, filed Dec. 18, 2014.
Bates et al., "Optimizing Program Performance With Assertion Management"; U.S. Appl. No. 14/577,162, filed Dec. 19, 2014.
Bates et al., "Assertions Based on Recently Charged Code"; U.S. Appl. No. 14/574,473, filed Dec. 18, 2014.
Bates et al., "Assertions Based on Recently Charged Code"; U.S. Appl. No. 14/577,296, filed Dec. 19, 2014.
Bates et al., "Assertion Management in an Integrated Development Environment", U.S. Appl. No. 14/577,445, filed Dec. 19, 2014.
Bates et al.; "Managing Assertions While Compiling and Debugging Source Code", U.S. Appl. No. 14/585,771, filed Dec. 30, 2014.
C.K. Luk, et al. "Pin: Building Customized Program Analysis Tools with Dynamic Instrumentation", Intel Corporation, Jun. 12-15, 2005, Website: http://rogue.colorado.edu/Pin, Email: pin.project©intel.com.
Pin—A Dynamic Binary Instrumentation Tool I Intel® Developer Zone; Submitted by Sion Berkowits . . . (/en-us/user/404501) on Wed, Jun. 13, 2012; https://software.intel.com/en-us/articles/pin-a-dynamic-binary-instrument . . . .
Mirshokraie et al., "JSART: JavaScript Assertion-Based Regression Testing," 2012, M. Brambilla, T. Tokuda, and R. Tolksdorf (Eds.): ICWE 2012, LNCS 7387, pp. 238-252.
Goloubeva et al., "Soft-error detection using control flow assertions," 2003, 18th IEEE International Symposium on Defect and Fault Tolerance in VLSI Systems, pp. 1-8.
Athavale et al., "Code Coverage of Assertions Using RTL Source Code Analysis," 2014, Proceedings of the 51st Annual Design Automation Conference, pp. 1 -6.
Godefroid et al., "DART: directed automated random testing," 2005, Proceedings of the 2005 ACM SIG Plan aonference on Programming language design and implementation, vol. 40, Issue 6, pp. 213-223.
Ve mu et al., "CEDA: control-flow error detection through assertions," 2006, 12th IEEE International On-Line Testing Symposium, pp. 1-6.
Bieman et al., "Using fault injection to increase software test coverage," 1996, Proceedings., Seventh International Symposium on Software Reliability Engineering, pp. 166-174.
Hangal et al., "Tracking down software bugs using automatic anomaly detection," 2002, Proceedings of the 24th International Conference on Software Engineering, pp. 291-301.
Kamal et al., "Automatic Generation of Assertions to Detect Potential Security Vulnerablitiles in C Programs That Use Union and Pointer Types," 2010, 4th International Conference on Network and System Security (NSS), pp. 351-356.
Drusinksy et al., "Rapid runtime system verification using automatic source code instrumentation," 2011, 6th International Conference on System of Systems Engineering (SoSE), pp. 1-6 [Abstract Only] [Available Online] http://ieeexplore.ieee.org/document/5966564/.
Rothermel et al., "Selecting tests and identliying test coverage requirements for modified software," 1994, Proceedings of the 1994 ACM SIGSOFT international symposium on Software testing and analysis, pp. 169-184.
Aggrawal et al., "Code coverage based technique for priortizing test cases for regression testing," 2004, ACM SIGSOFT Software Engineering Notes, vol. 29, Issue 5, pp. 1-4. [Abstract Only] [Available Online] http://dlacm.org/citation.cfm?id=1022511 &dl=ACM&coll=DL.

(56) References Cited

OTHER PUBLICATIONS

Srivastava et al., "Effectively priortizing tests in development environment," 2002, Proceedings of the 2002 ACM SIGSOFT international symposium on Software testing and analysis, pp. 97-106 [Abstract Only] [Available Online] http://dlacm.org/citation.cfm?doid=566172.566187.

* cited by examiner

| Tickets 502 | foo.C -- IDE Edit |
|---|---|
| 1 \| Error loading module 'foo' | if (!some_members_ok) {<br>    warn("archive %s contains no instrumentable members", canonical_libname);<br>} |
| 2 \| Seg fault writing to /dev/hda | |
| 3 \| Failure creating virtual network adapter on /dev/eth0 | CachedFileName = NULL;<br>CurrentFilename = 0;                                               ⚠-202<br>CurrentShortFilename = 0; |
| ... | if (update_globals == TRUE && static_checking) {<br>    commons.update_global_symbol_table(input);<br>} |
| Ticket Details 504 | if (static_checking) {<br>    commons.write_gsym_data_to_archive_file(ar_out);<br>} |
| When loading module 'foo',<br>program execution stops with<br>error 0x0BADF00D and core dump:<br><br>0000 0000 DEAD BEEF 0000 0000<br>00BA D00G F00D A5A5 A5A5 0000<br><br>Call stack:<br>foo()<br>bar()<br>baz()<br>... | ...<br>FinishTempCacheFile (libname, cache_name, tmp_cache_name,   ⚠-202<br>                  (        warnings_generated != WarningsGenerated<br>    220         \|\|       errors_generated != ErrorsGenerated ));<br>Ⓑ   report_file_resources (canonical_libname, cache_name, NULL); |

MANAGING ASSERTIONS WHILE COMPILING AND DEBUGGING SOURCE CODE

CROSS-REFERENCE TO RELATED APPLICATION

This application is a continuation of co-pending U.S. patent application Ser. No. 14/585,771, filed Dec. 30, 2014. The aforementioned related patent application is herein incorporated by reference in its entirety.

BACKGROUND

The present invention relates to integrated development environment (IDE) tools, and more specifically, to managing code assertions in a source code component when compiling and debugging source code in a development project.

Assertions are small segments of source code used to help debug a computer program. An assertion specifies a condition used to test whether a program functions correctly when executed. Typically, if the condition in an assertion evaluates to true, then the program is presumed to be functioning correctly (at least relative to the condition specified in the assertion). In such a case, the assertion does not interfere with program execution, apart from the overhead of testing the condition. However, if the condition in an assertion evaluates to false, the assertion could terminate the program, allow program execution to continue unhindered, throw an exception, or allow a user to choose how to proceed.

Typically, developers manually include, edit, and remove assertions from source code while developing an application. As developers use assertions to test source code, developers will typically remove assertions from source code during the development process once code is believed to be functioning correctly. For example, one approach is to turn assertions "on" or "off" using compiler preprocessing statements, e.g., ifdef expressions.

Assertions vary in complexity and the time required to be executed. A simple assertion, such as checking the value of a variable (e.g., "assert (i>0)") may have a minimal impact on processing. More complex assertions, such as determining whether the elements of a linked list are in a particular order may require relatively large amounts of processing time. Because processing assertions adds overhead to program execution time, it may be desirable to remove some assertions before compiling source code into program code.

However, as developers revise source code, some assertions may be useful to help identify and resolve defects.

SUMMARY

One embodiment of the present invention provides a method for managing assertions while compiling source code. The method generally includes generating at least a first compiler warning while compiling the source code files of a development project. The first compiler warning generally corresponds to at least one line of source code in a first source code component of the development project. A first set of assertions to add to the source code of the development project is determined based on the line of source code that resulted in the first compiler warning. The first set of assertions are added to the source code of the development and compiled as part of the source code of the development project.

In a particular embodiment, the method may also include receiving a request to insert a breakpoint at a specified location in the source code, determining a second set of assertions to include in the source code based on the specified location, and adding the second set of assertions to the source code, wherein the second set of assertions are compiled as part of the executable program.

In a particular embodiment, this method may further include launching a debugger to execute the compiled source code of the development project. While the debugger executes the compiled source code, a request to insert a breakpoint at a specified location in the source code may be received. In response, a second set of assertions to insert in the source code is determined and a breakpoint is added for each assertion in the second set of assertions at a location associated with each assertion.

Another embodiment of the present invention provides a computer-readable storage medium having instructions, which, when executed on a processor, performs an operation for managing assertions while compiling source code. The operation generally includes generating at least a first compiler warning while compiling the source code files of a development project. The first compiler warning generally corresponds to at least one line of source code in a first source code component of the development project. A first set of assertions to add to the source code of the development project is determined based on the line of source code that resulted in the first compiler warning. The first set of assertions are added to the source code of the development and compiled as part of the source code of the development project.

Still another embodiment of the present invention includes a processor and a memory storing a program, which, when executed on the processor, performs an operation for managing assertions while compiling source code. The operation generally includes generating at least a first compiler warning while compiling the source code files of a development project. The first compiler warning generally corresponds to at least one line of source code in a first source code component of the development project. A first set of assertions to add to the source code of the development project is determined based on the line of source code that resulted in the first compiler warning. The first set of assertions are added to the source code of the development and compiled as part of the source code of the development project.

Still another embodiment of the present invention provides a method for managing assertions. The method generally includes receiving a request to check out one or more source code components of a development project identified in a defect ticket. A first set of assertions to activate in the code components are identified. At least a first one of the code components are checked out and presented in an editing tool. An indication of each assertion in the first code component is presented in the editing tool at a specified location associated with each assertion.

DETAILED DESCRIPTION

Embodiments presented herein provide techniques for including assertions defined separately from of program source code during a compiling and debugging process. Assertions are a feature provided by many programming languages used to test conditions before execution of code (i.e., pre-conditions) and after execution of code (i.e., post-conditions). If an assertion fails, program execution can be halted, program execution can continue, the program can throw an exception, or the program can allow the developer to choose how to proceed. Information about where program execution is halted, or where an exception is thrown, can be used to debug the source code; however, assertions can provide additional information to aid in debugging.

In one embodiment, an integrated development environment (IDE) tool includes an assertion management component. As discussed below, the assertion management component allows a developer to specify which assertions are included in program source code when the source code is compiled. However, in one embodiment, the assertions are not stored in the source code files of an application program. Instead, the IDE tool manages a relationship between an assertion and a location in program source code where a developer specifies the assertion. Further, the IDE tool manages when assertions are included (or re-included) in the program code. For example, a developer may "activate" or "deactivate" an assertion or specify properties or parameters used by the IDE tool to determine whether to insert an assertion into program source code. When "active" the IDE inserts the assertion into program source code when that code is compiled. When "inactive" the assertion is simply left out of the source code.

The IDE tool may support a variety of programming languages which in turn support assertions. In addition to managing assertions, the IDE may include a text editor and project tools for writing, compiling, and debugging code. In some IDEs, code debugging tools allow developers to step through code execution and view program state, variable values, and other data in a graphical environment.

The assertion manager allows a developer to add, remove, and manage assertions in source code, separately from the source code. To do so, an assertion manager may create associations between code and properties defining an assertion and a location in source code. When code is compiled in the development environment, the assertion manager can insert some or all of the assertions defined through the assertion manager.

In addition to allowing a developer to define assertions managed by the IDE tool, the IDE tool may also manage assertions across users or groups. Some assertions may be particular to a user participating in a project and need not be included when other users compile and test the project. Assertions may also be owned by a group of users, and likewise, need not be included when members of other groups compile and test the project.

Assertions managed by the IDE tool may include a duration in which the assertion is included in compiled code. A developer may define the duration as a fixed date at which the assertion expires or a time offset from the last time the assertion is invoked during code execution. Alternatively, a developer can specify that an assertion is to be run a single time instead of defining a duration in which the assertion is added in compiled code.

The IDE tool may manage which assertions are included in compiled code based on assertion priority and execution time. A developer may define an amount of program execution time allotted to executing assertions. If the assertions take more time to execute than the allotted time, the IDE may selectively remove assertions from future compilations based on the assertion priority and execution time, as described in more detail herein. The IDE may also manage which assertions are included in compiled code based on assertion priority and other resource utilization thresholds, such as the size of compiled code.

The IDE tool may further manage which assertions are included in compiled code based on data provided to or generated by a compiler or debugger. For example, a developer may specify breakpoints used to halt program execution at a desired location within the source code, allowing the developer to step through the source code line-by-line during debugging. When source code is compiled, the compiler may generate warnings informing a developer of code that would not prevent the code from being compiled, but may not work properly (e.g., the compiled program may run but generate erroneous data). Based on the location of a breakpoint or a warning, the IDE tool may selectively add assertions into the source code. The set of assertions added based on compiler warnings includes assertions located after the code that generated the compiler warning, and the set of assertions added based on breakpoints (i.e., for debugging) includes assertions located before the breakpoint. Assertions may be added backwards (for debugging) or forwards (for compiler warnings) up to some scope, such as the current function, module, or a number of predecessor (for debugging) or successor (for compiler warnings) functions or modules.

The IDE tool may provide components that a developer can use to manage the development process, such as code version control tools, check in, check out, and commit control tools, and tools for defect or issue tracking in which a developer can view and address defects identified in defect tickets. A defect ticket may identify source code stored in one or more files of a development project, and assertions may be associated with various locations in the project source code identified in the defect ticket. When a developer checks out the defect identified by a defect ticket, the IDE tool may identify assertions to add to the project source code when a user compiles or debugs the project.

Advantageously, managing assertions separately from program source code may streamline program development. Over time, managing assertions outside of source code may prevent later-developed code from depending on variables or processes defined for assertions. Further, the IDE tool may be configured to add and remove assertions from program source code based on a variety of parameters. For example, the IDE tool may add and remove assertions based on breakpoints set in the source code, warnings generated when the code is compiled, source code related to a defect ticket, and so on.

Figure 1:
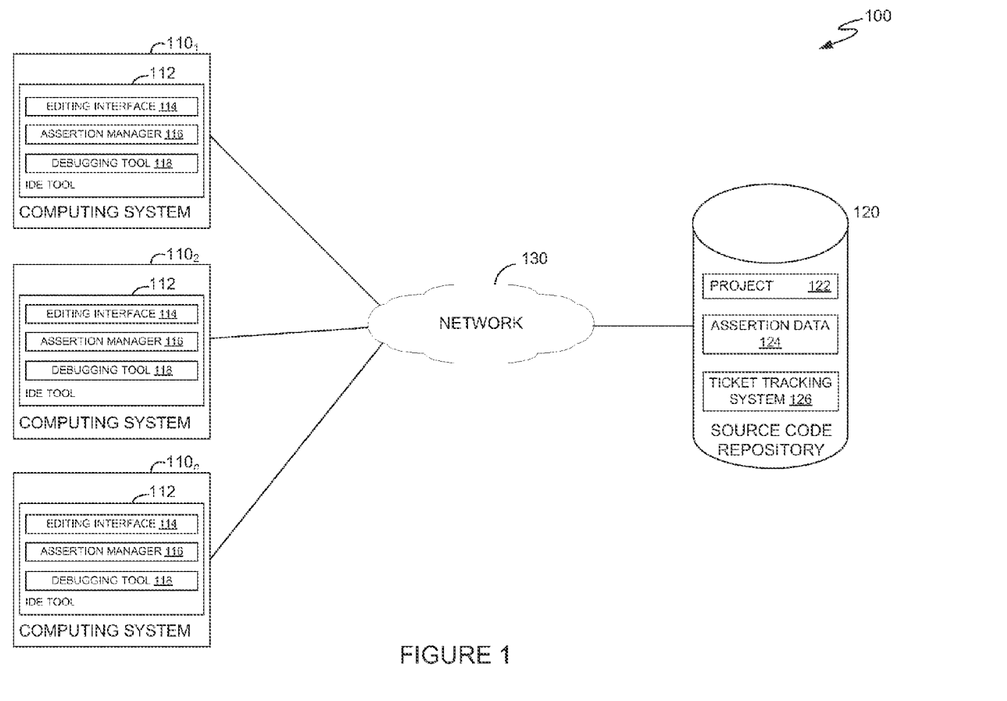
FIG. 1 illustrates an example of a computing environment, according to one embodiment.

FIG. 1 illustrates an example computing environment 100, according to one embodiment. As shown, the computing environment includes a plurality of computing systems $110_1$-$110_n$, a data store 120, and a network 130. As shown, each client device $110_1$-$110_n$ may be connected with source code repository 120 via a network 130. For example, network 130 may include the Internet, an intranet, a local area network, etc.

Computing system 110 may be a personal computer, workstation, mobile device, or any other computing device able to access network 130. Further, client device 110 may include an integrated development environment (IDE) tool 112 which may be configured to manage assertions outside of program source code, as described herein. As shown, IDE tool 112 includes an editing interface 114, an assertion manager 116, and a debugging tool 118. Editing interface 114 allows a developer to access and edit source code components associated with a development project stored in source code repository 120. Source code components include source code files, modules, functions, libraries, or portions thereof that can be viewed and/or edited in editing interface 114. Additionally, editing interface 114 allows a user to interact with defect tickets associated with the development project stored in source code repository 120. For example, editing interface 114 may display details of a selected defect ticket and the source code associated with the defect ticket. Assertion manager 116 provides a component of the IDE tool 112 configured to manage assertions separately from the source code. Editing interface 114 may interact with assertion manager 116 to indicate, in editing interface 114, lines of code where an assertion is defined. Debugging tool 118 is a component of the IDE tool used to compile the project source code into an executable and run the executable in a debug mode. While a developer runs the executable in a debug mode, the developer can halt execution, and view information about data used within the executable, and perform line-by-line execution of the source code to monitor for potential defects in the source code.

In some embodiments, the IDE tool 112 may manage assertions on based on the identity of a user or a group of users. Taking a mobile application project as an example, one team may be responsible for a graphical user interface (GUI), while another team may be responsible for modules enabling communication with a central server. The GUI team may be responsible for a different set of source code than the network communications team, and members of each team may independently manage assertions for their respective portions of the project. For example, if a developer interacting with an IDE tool 112 is associated with the GUI team, IDE tool 112 may allow the user to only edit and manage assertions in source code belonging to the GUI team. Development environment 112 may be precluded from showing any files associated with teams outside of the GUI team or may only provide read-only access to those files. Accordingly, an IDE tool used by a developer associated with the GUI team may be configured to prevent the developer from managing assertions in code owned by other development teams.

In one embodiment, source code files for a project are stored in source code repository 120. For example, project 122 may include the various source code files for the project as well as other data for the project. Source code repository 120 may include a code versioning system that manages source code files for project 122. The code versioning system allows developers to check out source code to modify and commit the modified source code as a new version in the code versioning system. In addition, assertions defined for the source code are also stored in source code repository 120 as assertion data 124. Assertion data 124 may include assertion definitions and relationships between assertion definitions and locations in the source code files included in project 122.

Source code repository 120 may further include a ticket tracking system 126. Ticket tracking system 126 may store a collection of defect tickets, which each describe a defect in a program and identify source code components associated with the defect (if known). The defect description may also include a narrative description of the defect, images illustrating the defect, memory contents generated from a core dump, and other information that may be pertinent to resolving the defect.

Figure 2:
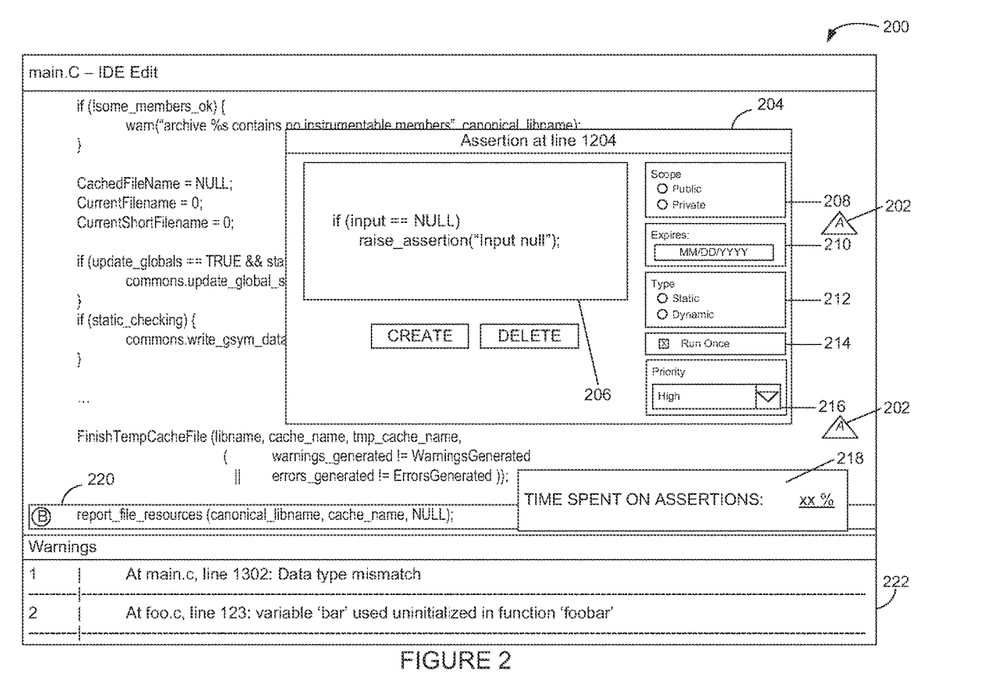
FIG. 2 illustrates an example user-interface of an integrated development environment (IDE) tool, according to one embodiment.

FIG. 2 illustrates an example graphical user interface (GUI) 200 of an IDE tool, according to one embodiment. As illustrated, the interface 200 displays the source code for a file "main.c" being edited by a developer using editing tool 114. The IDE tool allows a developer to include assertions in source code. However, rather than including the content of an assertion inline with source code, the IDE tool may store the assertions separately from the source code file.

Further, when a developer accesses a source code file, the IDE tool may determine whether any assertions have been defined for that file. If so, the IDE tool may present an indication in the editing interface points in the source code where an assertion has been defined. For example, icons $202_{1-2}$ indicate points in the source code where an assertion has been defined. Specifically, icon $202_1$ indicates that an assertion has been defined for line 1204 of the file "main.c". When the developer compiles the source code in this file, the IDE tool inserts in the source code supplied to a compiler. In some cases, the assertion manager may further determine if the IDE tool should display an icon at the location of an assertion and insert the assertion in the source code based on a variety of parameters, such as assertion priority, scope, or other parameters, as described herein.

In one embodiment, the editing interface of the IDE tool displays icons 202 for any assertions that will be included when the source code is compiled. Alternatively, however, the interface could show different icons to indicate whether an assertion is currently "active" or "inactive" (or other properties). GUI 200 may display icons 202 for public assertions, private assertions owned by the user of the GUI, assertions "owned" by a development team, or any combination thereof.

When a developer selects an icon 202, or creates an assertion, the IDE tool displays a dialog box 204 in the GUI. Dialog box 204 prompts a developer to specify source code for the assertion and any parameters used to manage whether the assertion is included in the code at compile time. For example, as shown in FIG. 2, dialog box 204 includes an editing pane 206 used to define the content of an assertion. As illustrated, the assertion at line 1204 checks whether an input is null.

Scope field 208 allows a user to define the scope of an assertion. An assertion may generally be visible to any developer which accesses the source code file, allowing any developer working on the project to view or edit this assertion, as well as include the assertion in the source code at compile-time. In contrast, the IDE tool may present assertions marked as private to only the developer who defined that assertion. In some embodiments, whether an assertion is visible may depend on whether a developer is a member of a given user group. That is, in addition to "private"—all users—and "public"—one user—assertions may be visible to a group of users. Such a scope may allow a team of developers to access an assertion (e.g., the GUI team in the mobile application example above) but prevent other teams of users (e.g., the network team in the mobile application example above) from accessing the assertion.

Field 210 allows a user to define when an assertion expires—that is, when an assertion should not be included in source code when compiled. As shown the expiration is defined as a date. However, the expiration could also be defined as a number of days an assertion should remain active or as a number of days after an assertion last failed. That is, if the assertion does not fail within the defined time period, the assertion manager may stop including the assertion in future compilations of the source code.

Type field 212 allows a user to define if an assertion is static or dynamic. Static assertions are inserted into source code during the compilation process. In contrast, dynamic assertions may be inserted into source as appropriate. The IDE tool may need to manage code executed by an interpreter, such as PERL, Python, or Java code. For projects developed in an interpreted language, dynamic assertions may be inserted into code without requiring recompilation of the code; instead, code defining the dynamic assertion can be provided to an interpreter when execution of the compiled code reaches a specified location.

Run once field 214 allows a user specify that assertion should be run only one time. If selected, the IDE tool includes the assertion in source code only once. For example, for a static assertion, the IDE tool may track whether the assertion has been included in compiled code or whether the project was built and run from the IDE tool (e.g., in a debugging environment). For dynamic assertions, the IDE tool may be configured to insert the assertion at the specified location only once when the source code is passed to runtime engine for interpreted code.

Priority field 216 allows a user to specify a priority level for an assertion. In some cases, priority definitions can be relatively coarse, such as providing options to define an assertion as low, medium, or high priority. In other cases, priority definitions can allow for finer control of assertion priority (e.g., a numeric priority value, such as on a 1-10 scale).

As shown, user interface 200 also includes a field 218, which allows a user to specify a utilization constraint. The utilization constraint defines an amount of resources available for assertions inserted into code. In some cases, a user may define a percentage of time evaluating assertions in compiled code. However, resource utilization may be defined using any appropriate resource utilization metric (e.g., memory usage).

In each of the cases discussed above, the IDE may store the assertions separately from the source code files of a development project. Further, while the above discussion illustrates some parameters (scope, expiration time, type, and run-once), assertions may be defined by additional parameters, some of which are discussed below.

The user interface 200 allows a developer to add breakpoints 220 in project source code. Breakpoints 220 may be set to halt program execution during project debugging or halt program execution only when some condition is satisfied. In some cases, a user may save a set of breakpoints 220, watches, and other data used by a compiler and debugger in a debugger environment file. Multiple debugger environment files may be stored (locally or as part of the source code project) for different breakpoint configurations used to test different aspects of a source code project. When a developer is testing an aspect of a source code project, a debugger environment file may be loaded to insert the set of breakpoints 220 in the source code project and set the defined watches, environment variables, and other data in the compiler and debugger.

For example, assume a developer is debugging the program shown in user interface 200 and that the debugger is stopped execution on the source code statement "CurrentShortFileName=0;" based on a breakpoint set on this statement. In such a case, an assertion of a prior source code statement (e.g., "CacheFileName=NULL;)" could have been inserted in response to the breakpoint at "CurrentShortFileName=0;". In one embodiment, an unlabeled assertion such as this may be implemented as a dynamic assertion. That is, the debugger may set an internal breakpoint at the line for "CacheFileName=NULL;". For example, the debugger may set this internal breakpoint by replacing the first op code associated with this statement with a break or other opcode that will cause a trap. When this particular breakpoint is encountered, the trap occurs and the dynamic assertion is executed by the debugger. Execution then continues (provided the assertion did not result in program termination).

When execution reaches the line with the breakpoint (i.e., CurrentShortFileName=0;) set by the developer, the debugger halts execution based on that breakpoint. Note, if the assertion associated with this line (again, "CurrentShortFileName=0;") was a static or compiled assertion that was in an enabled state the opcode, the debugger may replace the first opcode associated with the assertion since it would have been compiled into the program before the actual code associated with the line. (i.e., we want the assertion to run before the statement at this line). That is, the breakpoint set by the developer on the statement "CurrentShortFileName=0;" would actually be triggered by the first opcode of the assertion set on this statement.

On the other hand, if the assertion defined for the statement "CurrentShortFileName=0;" was a dynamic assertion, then the debugger may repurpose a breakpoint that implements the assertion so when the trap is encountered, it first causes a debug stop, then when the user continues it will run the assertion. The same result occurs for an assertion enabled by the debugger at the line were a breakpoint is already set. The breakpoint will be created so when the trap associated with the breakpoint occurs, the debugger first stops execution and lets the user examine variables, etc. When the user lets the program run any breakpoints that were enabled at this location as a result of a breakpoint being added would run.

User interface 200 may also provide a warning panel 222, which displays warnings generated when the project source code is compiled. Compiler warnings may identify a line of code that which can be successfully compiled, but result in the compiled executable to run incorrectly. Compiler warnings may also inform a developer of the reason the compiler generated the warning.

Figure 3:
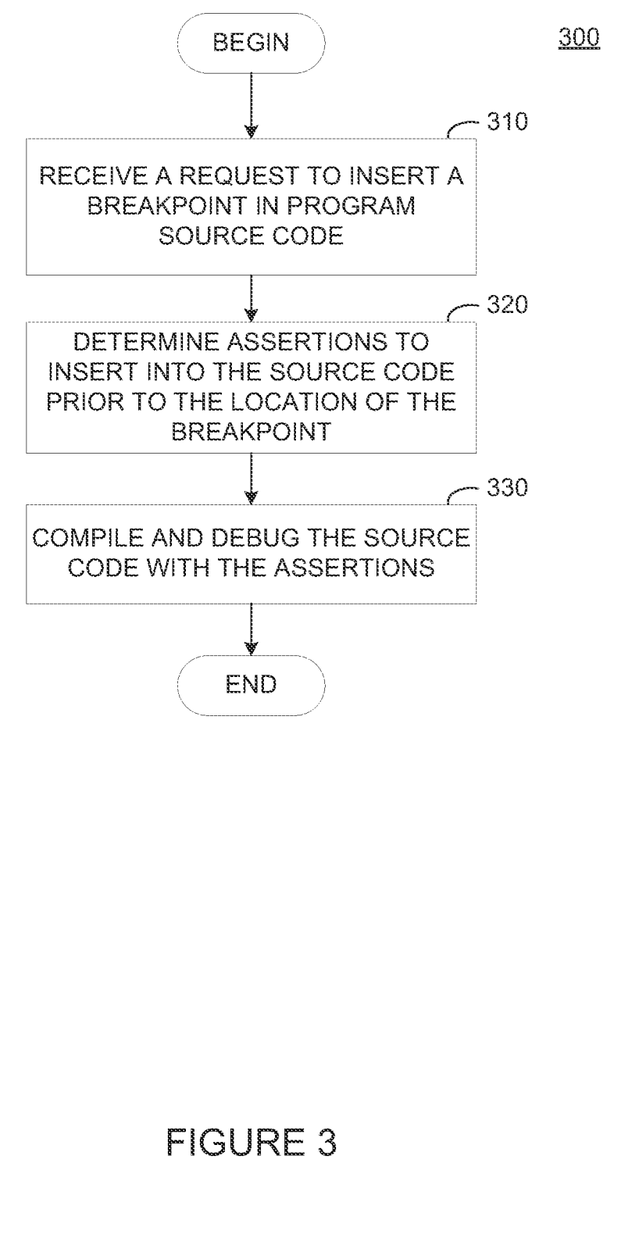
FIG. 3 illustrates a method for identifying assertions to include in compiled source code run in a debug environment based on breakpoints, according to one embodiment.

FIG. 3 illustrates a method for an IDE tool to manage assertions associated with program source code, according to one embodiment. As shown, method 300 begins at step 310, where the IDE tool receives a request to insert a breakpoint in program source code. In some embodiments, breakpoints added to a source code file may be specified in a debugger environment file.

At step 320, the IDE tool selects any assertions to include in the source code based on the breakpoint. As discussed above, assertions added to source code based on breakpoints include assertions located before the breakpoint. In one embodiment, the IDE tool selectively determines which assertions of the set of assertions defined for code executed before the breakpoint are to be inserted into the source code. Dynamic assertions may be included in compiled project source code when breakpoints are set in the source code. After a developer adds a breakpoint, the compiler may add additional breakpoints to locations corresponding to assertions. When these compiler-added breakpoints are tripped, the debugger executes the assertion and may notify a developer that an assertion that was executed. If the assertion evaluates to true, the debugger may further notify the developer that the assertion executed successfully and continue executing the program. If the assertion evaluates to false, the debugger may notify the developer that the assertion failed and may interrupt execution of the program (e.g., throwing an exception, halting program execution, etc.).

In one embodiment, the IDE tool may track the locations where a developer sets breakpoints and locations where a developer halts program execution (e.g., when a developer pauses program execution in the debugging environment). The IDE tool may track these locations, for example, by saving information about breakpoints and developer-initiated halt locations each time the project is compiled and debugged. Based on the tracked breakpoint and execution halt locations, the IDE can discover common debugging scenarios. For example, the IDE tool may use pattern matching to find previously used sets of breakpoints and developer-initiated halt locations that include the breakpoints set by the developer. If the number and location of breakpoints set by a developer matches a threshold amount of a pattern, the IDE can then determine that the pattern of breakpoints partially matches one of the common debugging scenarios. If the IDE tool detects a partial match, the IDE tool identifies assertions to activate based on the location of the breakpoints in the partially matched common debugging scenario. Activating assertions in areas where breakpoints are not set may provide debugging coverage in an area that may be important to debugging or otherwise resolving the problem defined by the debugging scenario.

In another embodiment, the IDE may generate a control flow graph from debug data. The control flow graph provides information about paths of execution traversed to arrive at the location of a breakpoint. Assertions located on a path identified by the control flow graph may be inserted into the project source code for debugging.

In some cases, the IDE tool may notify a user of any assertions added to an executable under debug when the user sets a breakpoint. The IDE tool may notify a user in a specialized panel in the IDE user interface, a pop-up message box, output to a log file, and so on.

At 330, the IDE tool receives a request to compile the program source code (or project which includes the program source code). For projects written in interpreted languages (e.g., Java, Python, Ruby, etc.) or run in a debugging environment, breakpoints and assertions may be inserted into the project source code while the executable is running For projects written in a compiled language, the compiler may determine which assertions to insert into the compiled executable based on breakpoint information defined in, for example, in the development environment or a debugger environment file, as discussed above.

When project source code is compiled, the IDE determines relationships between object code (executed instructions) and the source code from which the object code is generated. These relationships may be used to illustrate, within an editing pane in the IDE tool, the next line of code to be executed when a developer is performing line-by-line debugging of program source code. These relationships may be updated when a developer sets a breakpoint in source code that the developer is running in a debugger session. When a breakpoint is introduced while a debugger session is running, the debugger identifies the location of the breakpoint and assertions to insert into the already-compiled code (e.g., assertions in the routine or method in which a breakpoint is set, or assertions in code that reaches the breakpoint location). After the debugger identifies the assertions to insert, the debugger adds breakpoints at the location of each such assertion. When code execution reaches one of these breakpoints, the debugger executes the assertion.

Figure 4:
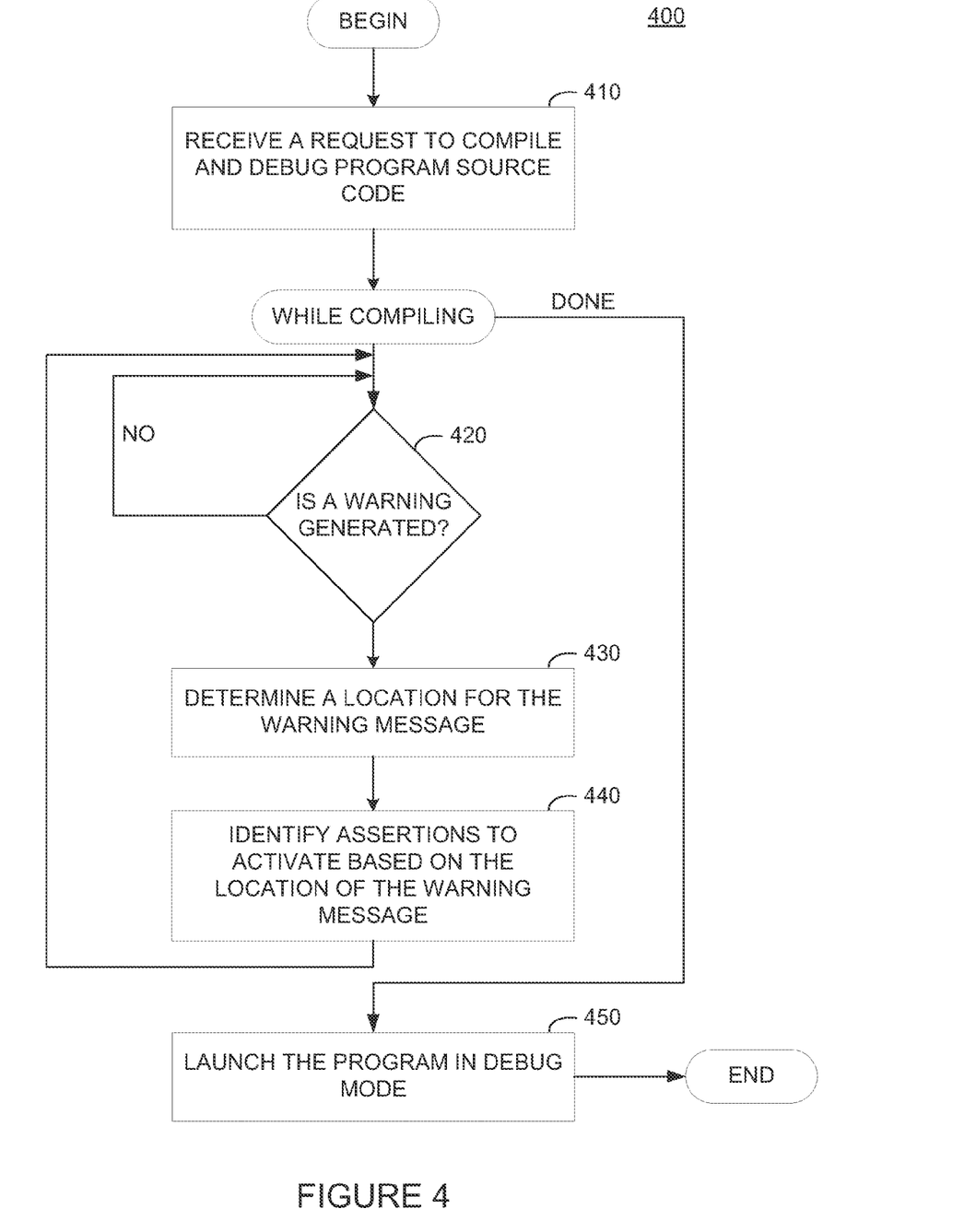
FIG. 4 illustrates a method for identifying assertions to include in compiled source code run in a debug environment based on warnings generated when compiling the source code, according to one embodiment.

FIG. 4 illustrates a method for an IDE tool to manage assertions associated with program source code, according to one embodiment. As shown, method 400 begins at 410, where the IDE tool receives a request to compile the source code files of a development project. The IDE tool may receive an input of makefile as part of the request, which includes instructions that the compiler uses to build the source code into an executable. In response, the IDE tool may invoke a compiler. While compiling the program source code, the IDE tool compiler determines whether any warnings have been generated (step 420). After generating a warning, the compiler identifies the location of the source code that generated the warning message.

At step 440, the compiler identifies assertions to activate based on the location of the source code that generated the warning message. In some embodiments, assertions following the location of the source code that generated the warning message may be activated. In one embodiment, the compiler may determine that all assertions associated with the routine containing the line of code that generated the warning should be added to the source code for compilation.

In one embodiment, a control flow graph can be used to identify which assertions to include in the compiled executable. In the compilation process, source code can be compiled into intermediate code. While the source code is compiled into intermediate code, the compiler can generate a control flow graph that identifies relationships between pieces of code, such as the reachability of code. Based on the control flow graph and a location of a warning, the compiler can then determine successor code to the location of the warning and enable assertions defined in the successor code.

In an embodiment, intermediate code can be generated from project source code with all assertions inserted in the code. Assertions labeled as disabled or inactive may be inserted in the intermediate code with instructions that prevent the assertion from executing. For assertions that are already labeled enabled (i.e., assertions which are active in the compiled executable), no further action is necessary. However, for assertions that are disabled (i.e., assertions which are inactive in the compiled executable), the compiler can rewrite the intermediate code to remove the disabled assertions in a subsequent re-write of the intermediate code to remove code that will not be used. If a warning is generated for code that precedes a disabled assertion, the compiler can enable the assertion and thus prevent the rewritten intermediate code from removing the assertion in a subsequent re-write of the intermediate code.

When the compiler finishes compiling the project source code into an executable, the IDE launches the executable in a debug mode (step 450). The IDE tool may notify a user of assertions inserted based on warnings. The IDE tool may notify a user in a panel in the IDE user interface, a pop-up message box, output to a log file, and so on.

Figure 5:
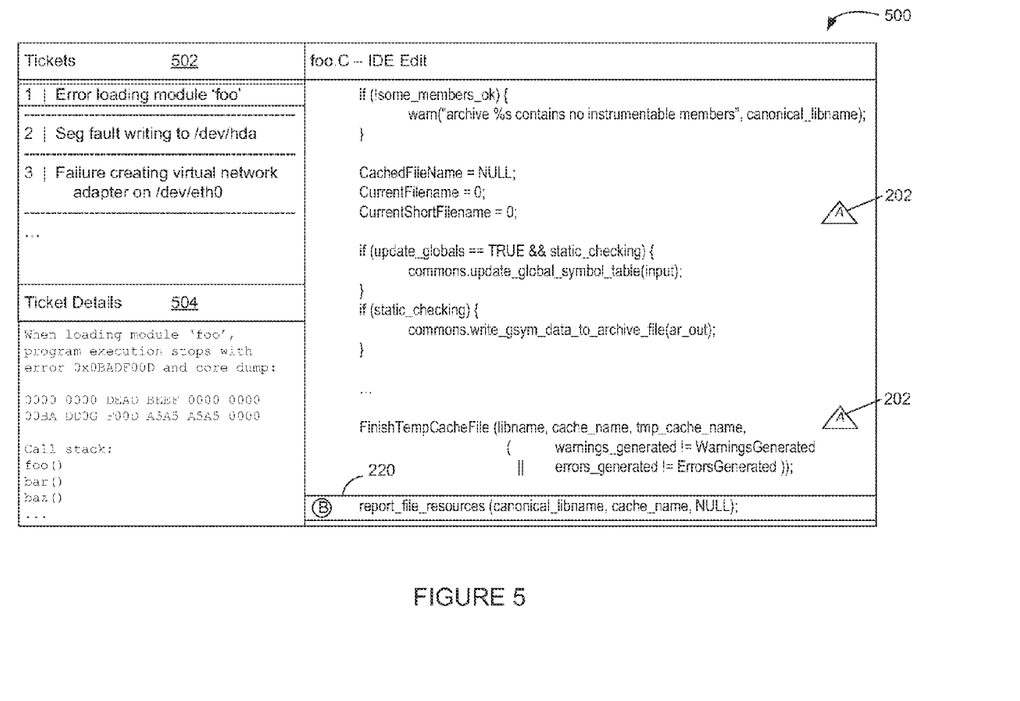
FIG. 5 illustrates an example user-interface of an IDE tool, according to one embodiment.

FIG. 5 illustrates an example user-interface 500 of an IDE tool, according to one embodiment. Like user-interface 200, user-interface 500 displays source code from a given source code file and icons 202 indicating points in the source code associated with an assertion. Additionally, user-interface 500 includes an interface for viewing defect tickets. For example, panel 502 lists a number of defect tickets available for a developer to select. When a user selects a defect ticket in ticket panel 502, ticket detail panel 504 displays a description of the defect. Ticket detail panel 504 may be configured to display text and image content associated with a defect ticket. For example, as illustrated in FIG. 5, ticket number 1 is selected in ticket panel 502. The details of ticket number 1, which includes a narrative description, a core dump showing the memory contents when the error occurs, and a call stack showing the active functions at the time of the error, are displayed in ticket detail panel 504.

When a developer selects to work on a defect ticket, the IDE tool may check-out the relevant project source code file (e.g., from a source code repository). While the source code files are checked out, the developer can edit, compile, and debug the code. After the developer fixes the defect, the developer can submit the revised source code files to the code versioning system and submit the defect as fixed.

In one embodiment, when a developer selects a defect ticket, the IDE tool may add assertions (or activate inactive assertions) to the course code files checked out with the defect ticket. For example, the IDE tool may enable all assertions associated with source code files identified in the defect ticket. Alternatively, the IDE tool may selectively enable assertions associated with the checked out source code based on information in the defect ticket. For example, the IDE tool may use the contents of a call stack and error details (if this information is included in the defect ticket) to determine which assertions are to be included in future compilations of the project source code. Since the call stack includes details of the active subroutines at the time of a core dump, the IDE tool can activate assertions defined in all of or a subset of (e.g., the first n subroutines identified on the call stack) the active subroutines.

Further, assertion definitions may include user-defined keywords. If a defect ticket includes at least one of the user-defined keywords, the IDE tool may choose to activate the assertion and insert the assertion into project source code for compilation and debugging.

Figure 6:
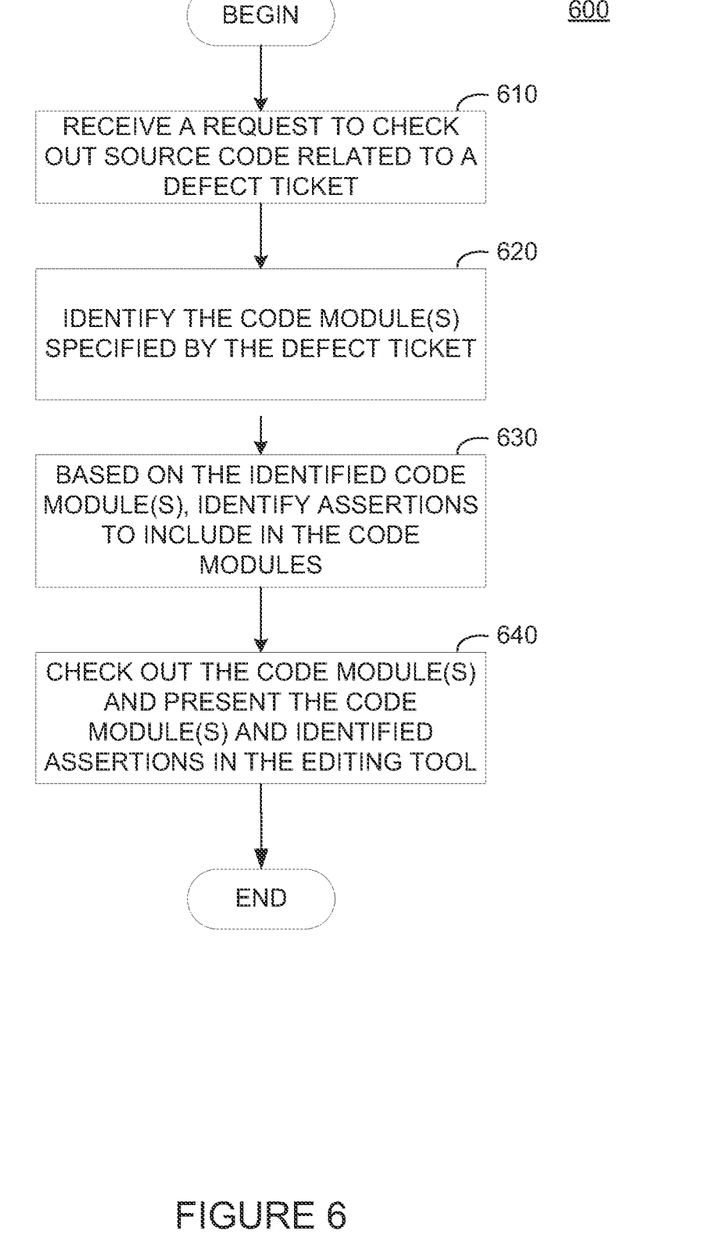
FIG. 6 illustrates a method for identifying assertions displayed in an IDE tool, according to one embodiment.

FIG. 6 illustrates a method 600 for an IDE tool to manage assertions, according to one embodiment. Method 600 begins at 610, where the IDE tool receives a request to check out source code related to a defect ticket. The IDE tool can retrieve the contents of the defect ticket (e.g., from a ticket tracking system stored locally or on a network). In some cases, the defect ticket includes information that can be used to retrieve details of a defect (e.g., a ticket identifier used as a primary key in a database that stores defect tickets). In some cases, the defect ticket includes structured data that the IDE can parse to determine the details of the defect.

At 620, the IDE tool identifies the source code modules specified by the defect ticket. As discussed, the IDE tool can parse a call stack and/or other log data included in the defect ticket to determine which code modules to check out from a code versioning system.

At 630, the IDE tool identifies assertions to include in the project source code. Since assertions are managed outside of the source code, the IDE tool may display indications of the included assertions (e.g., as icons) at the location in source code where the assertion would be inserted when the project source code is compiled. As discussed above, the IDE tool can identify code modules specified by the defect ticket based on, for example, the contents of a call stack included in the defect ticket. Based on the identified code modules, the IDE tool can search for assertions associated with the identified code modules and activate some or all of the assertions. For example, assertions may be activated if an assertion includes a keyword. In some cases, the IDE tool can determine which assertions to activate based on a priority threshold, a resource usage threshold, or some other metric. For example, the IDE tool can choose to activate only the assertions with a high level of importance, or the IDE can choose to activate a subset of assertions with the highest priorities and a total resource usage below the threshold.

At 640, the IDE tool checks out the source code files associated with the defect ticket. Once a developer checks out the source code, an editing pane in an IDE displays the source code. Icons representing the location of an assertion can also be displayed in the editing pane, as discussed above. Additionally, the IDE can display details of the selected defect ticket.

Figure 7:
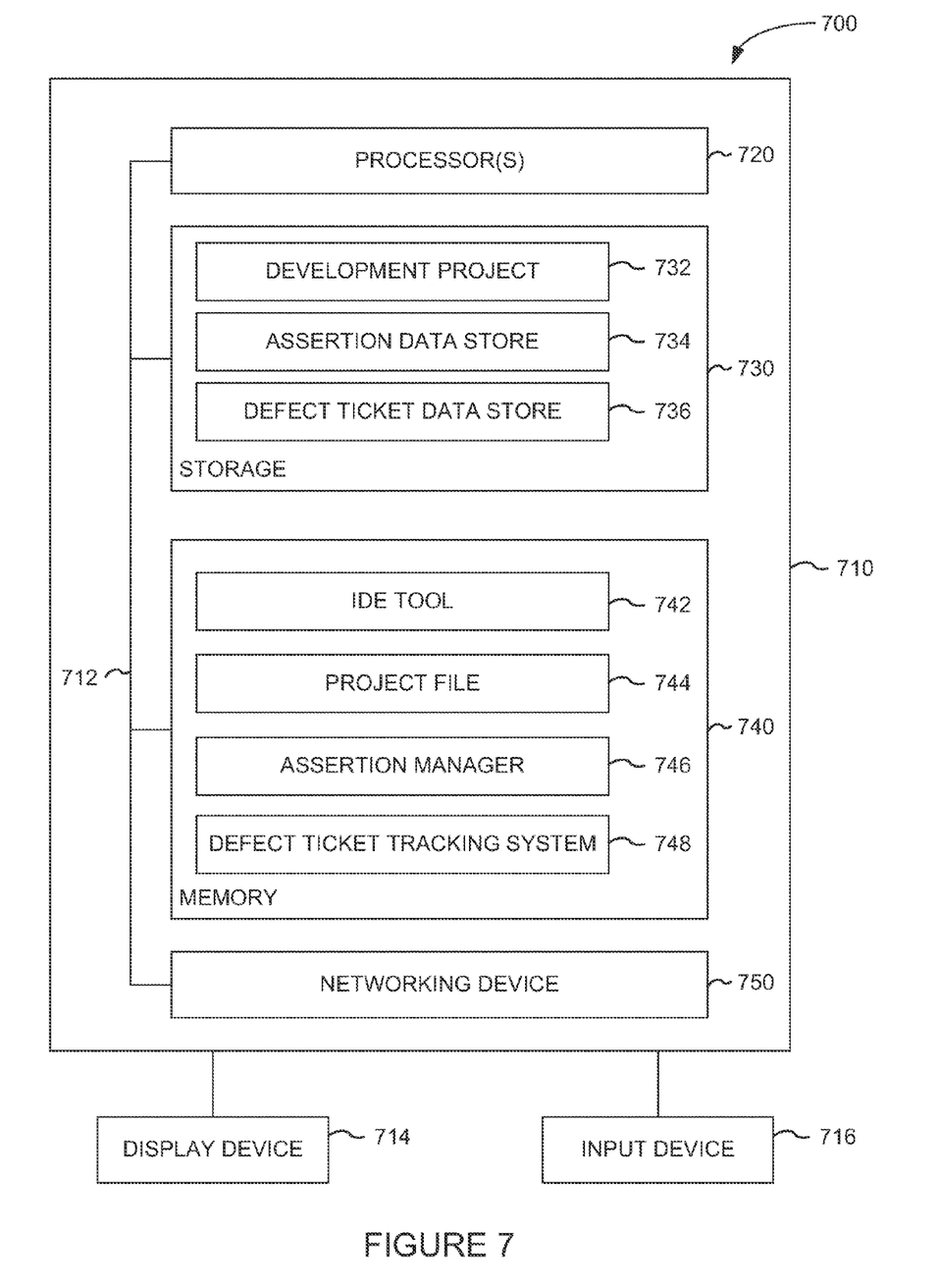
FIG. 7 illustrates an example computing system, according to one embodiment.

FIG. 7 illustrates an example computing system 700, according to an embodiment of the present invention. As shown, computing environment 700 includes computer system 710. Computer system 710 is included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Further, although FIG. 1 illustrates a single computer system, those skilled in the art will recognize that embodiments of the invention may be adapted for use on multiple systems configured to communicate over a network. Additionally, those skilled in the art will recognize that the illustration of computer system 710 is simplified to highlight aspects of the present invention and that computing systems and data communication networks typically include a variety of additional elements not shown in FIG. 1.

As shown, computer system 710 includes one or more processors 720, a storage device 730, memory 740, and a networking device 750, all connected by a bus 712. Computer system 710 may be connected to one or more display devices 714 and one or more input devices 716. User input devices 716 may include a mouse pointing device, a keyboard, pen input devices, and the like. Display devices 716 may include CRT monitors, LCD displays, projectors, and the like. The processing activity and hardware resources on computer system 710 may be managed by an operating system (not shown). Network device 750 may connect computer system 710 to a data communications network, including both wired and wireless networks.

Storage device 730 may store application programs and data for use by computer system 710. Typical storage devices include hard-disk drives, flash memory devices, optical media, network and virtual storage devices, and the like. As shown, storage device 730 contains a development project 732, an assertion data store 734, and a defect ticket data store 736. Development project 732 may contain a variety of files including source code, compilation configuration files, debugging information, and other artifacts used to develop a software application. Assertion data store 734 may be, for example, a database, a series of flat files, or some other appropriate data repository. Defect ticket data store 736 may also be, for example, a database, a series of flat files, or some other appropriate repository.

As shown, memory 740 stores an IDE tool 742, a project file 744, an assertion manager 746, and a defect ticket tracking system 748.

IDE tool 742 provides a programming environment that assists a computer programmer in developing software. IDE tool 742 may include a source code editor, a compiler and/or interpreter, build-automation tools, and a debugger (not shown). Other components provided by IDE tool 742 may include a version control system, a class browser, an object inspector and, a class hierarchy diagram generator, etc.

Project file 744 represents a file included in development project 732 that is being edited by a developer using IDE tool 742 (e.g., a source code file of a software application). IDE tool 742 may display the text of the source code to the developer on display device 714 and provide an interface that allows the user to edit project file 744. IDE tool 742 may also provide an interface for a user to display the contents of a defect ticket managed by defect ticket tracking system 748 and check out code from project 744 related to the defect ticket for editing and debugging.

Assertion manager 746 manages assertions in project file 744. Assertion manager 746 may interact with assertion data store 734 to add or modify assertions stored outside of source code in a project file 744 and development project 732. Rather, the IDE tool stores the source code and parameters for each assertion in storage device 730 as assertion data and maintains data sufficient to identify the source code files and locations in source code associated with the each assertion. During execution of a program compiled from development project 732, assertion manager 746 may monitor the performance of assertions in an executable and determine assertions to be removed from program source code, as described herein. Further, assertion manager 746 may monitor for changes in source code and activate assertions based on the changes to source code, as described herein.

Defect ticket tracking system 748 manages defect tickets related to project file 744 to be addressed by a developer working on project file 744. Defect ticket tracking system 748 may interact with defect ticket data store 736 and development project 732 to manage relationships between defect tickets stored in defect ticket data store 736 and development project 732. Defect ticket tracking system may also interact with IDE tool 742 to allow a user to check out code from development project 732 for modification and check in code after modification.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the integrated development environment) or related data available in the cloud. For example, the integrated development environment could execute on a computing system in the cloud to management assertions outside of program source code. In such a case, the IDE could manage assertions outside of program source code and store information defining such assertions at a storage location in the cloud at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing assertions included in an executable program compiled from source code, the method comprising:
    while compiling the source code of a development project:
        generating at least a first compiler warning, wherein the first compiler warning corresponds to at least one line of source code in a first source code component of the development project;
        determining, based on the line of source code that resulted in the first compiler warning, a first set of assertions to add to the source code of the development project; and
        adding the first set of assertions to the source code of the development project, wherein the first set of assertions are compiled as part of the executable program.

2. The method of claim 1, wherein determining the first set of assertions to add to the source code of the development project comprises:
    determining a location of the first compiler warning in a control flow graph;
    identifying, from the control flow graph, one or more source code components reachable from the location of the first compiler warning in the control flow graph; and
    including assertions associated with the identified source code components in the first set of assertions.

3. The method of claim 1, wherein the first set of assertions includes assertions that are associated with the first source code component in the development product which follow the line of source code that resulted in the first compiler warning.

4. The method of claim 1, further comprising:
    generating a notification of the first set of assertions added to the source code of the development project, wherein the notification is included with the first compiler warning.

5. The method of claim 1, further comprising:
    launching a debugger to execute the compiled source code of the development project.

6. The method of claim 5, further comprising:
    while the debugger is performing line-by-line execution of the compiled source code:
        receiving a request to insert a breakpoint at a specified location in the source code;
        determining a second set of assertions to insert in the source code;
        adding a breakpoint for each assertion in the second set of assertions at a location associated with each assertion; and
        executing an assertion in the second set of assertions when the debugger reaches one of the added breakpoints.

7. The method of claim 1, further comprising:
    receiving a request to insert a breakpoint at a specified location in the source code;
    determining a second set of assertions to include in the source code based on the specified location; and
    adding the second set of assertions to the source code, wherein the second set of assertions are compiled as part of the executable program.

8. The method of claim 7, wherein the second set of assertions includes one or more assertions which precede the specified location of the breakpoint.

9. A computer implemented method for managing assertions, comprising:
    receiving a request to check out one or more source code components of a development project identified in a defect ticket;
    identifying a first set of assertions to insert into the source code components at compile time based on data included in the defect ticket;
    checking out the code components; and
    presenting at least a first one of the code components in an editing tool, wherein the editing tool presents an indication of each assertion in the first code component at a location associated with each assertion.

10. The method of claim 9, wherein identifying the first set of assertions to include in the code components comprises:
    identifying functions listed in a stack trace included in the defect ticket; and
    including assertions associated with at least one of the identified functions.

11. The method of claim 9, wherein identifying the first set of assertions to activate in the code components comprises:

identifying a location in the source code of an error specified in the defect ticket; and including one or more assertions in the source code.

12. The method of claim 9, wherein the one or more assertions include one or more keywords, and wherein the identifying one or more assertions is further based on whether the assertions include at least one of the one or more keywords.

* * * * *